May 18, 1965 W. R. CALVERT 3,184,291
MAINTENANCE OF A CATALYTIC EXHAUST PURIFIER
Filed March 8, 1963 2 Sheets-Sheet 1

INVENTOR.
WILLARD R. CALVERT
BY
ATTORNEYS

INVENTOR.
WILLARD R. CALVERT
BY
ATTORNEY 3,184,291
MAINTENANCE OF A CATALYTIC
EXHAUST PURIFIER
Willard R. Calvert, Ridley Park, Pa., assignor to Oxy-Catalyst, Inc., Berwyn, Pa., a corporation of Pennsylvania
Filed Mar. 8, 1963, Ser. No. 263,820
1 Claim. (Cl. 23—288)

This invention relates to the maintenance of a catalytic exhaust purifier and more particularly is useful for filling, emptying and rejuvenating a catalytic exhaust purifier.

Catalytic exhaust purifiers for automobiles are well known to the art. This invention relates to such purifiers which employ a catalyst bed containing relatively small catalyst pellets. The catalyst pellets are normally substantially spherical and of a diameter of from about .020 inch to 0.25 inch, the term "diameter" being intended to mean the dimension established by sieve testing. While such a catalyst is advantageous, other relatively free-flowing catalysts such as larger pellets and pellets formed by extrusion can obviously be employed while still retaining the benefits of this invention.

In accordance with this invention there is provided means for filling or emptying a catalyst bed with catalyst pellets. When an exhaust purifier is secured to the chassis of an automobile to purify the exhaust gases from its internal cambustion engine, the catalyst bed must be periodically replenished and at more frequent intervals refilled. In accordance with this invention, these tasks can be accomplished readily without removing the exhaust purifier from its installed position.

In addition, when the exhaust purifier is used with an automobile operated on leaded gasoline, this invention provides means to periodically rejuvenate the catalytic purifier by the mechanical removal of lead compounds accumulated in the catalyst bed in the form of dust.

Further this invention provides advantageous means for controlling the dangerous dust, including lead dust, removed from the catalyst bed when the expended catalyst is being removed.

The invention and its objects will be further clarified from a study of the following description read in conjunction with the drawings in which.

Figure 1:
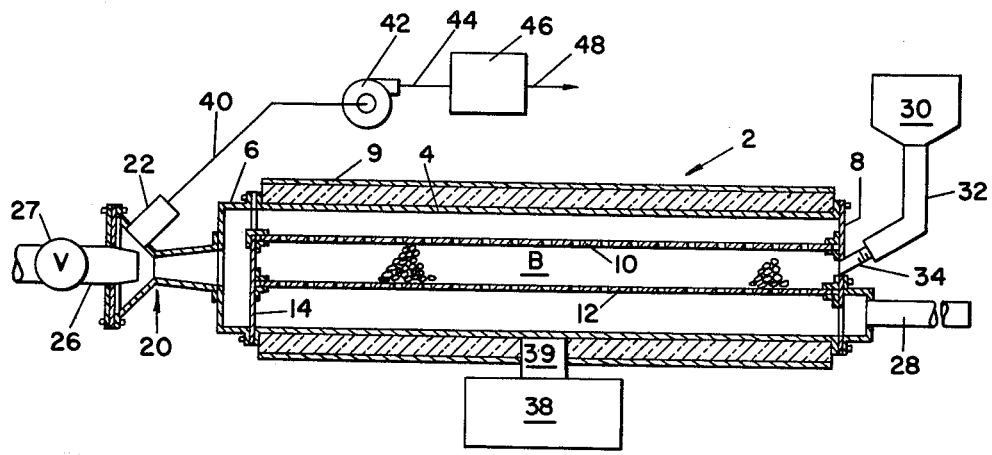
FIGURE 1 is a semi-diagrammatic view of a typical catalytic exhaust purifier showing the adding of catalyst pellets to the catalyst bed in accordance with this invention.
Figure 2:
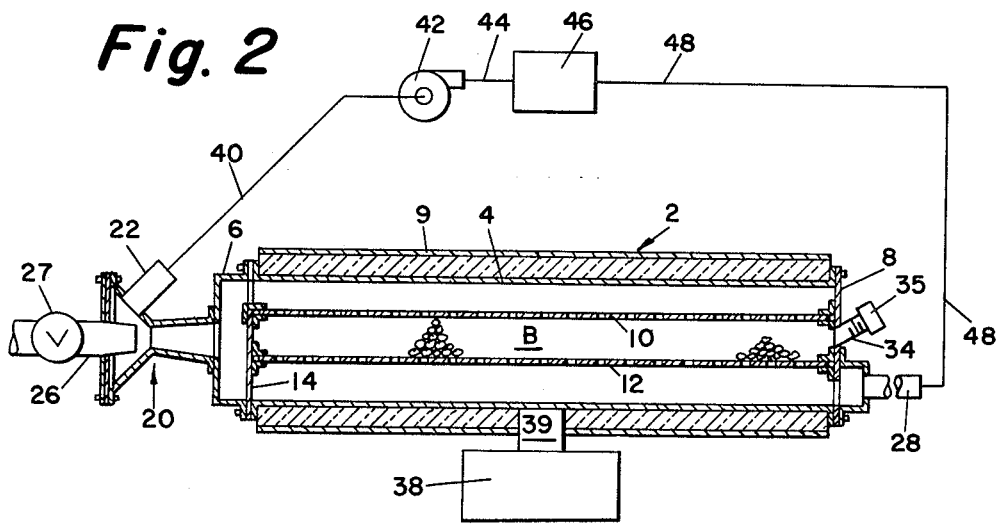
FIGURE 2 is a semi-diagrammatic view of the purifier of FIGURE 1 with the catalyst bed being rejuvenated in accordance with this invention.

A typical catalytic exhaust purifier 2 employed with an automobile, and which is typical of catalytic exhaust purifiers in connection with which this invention is useful, is shown in FIGURES 1 and 2. Referring particularly to FIGURE 1, the exhaust purifier 2 has a casing 4 to which end portions 6 and 8 are flanged. An insulation cover 9 overlies casing 4. A catalyst bed indicated at B is contained between foraminous grids 10 and 12 which are supported on baffle plate 14 and end portion 8 respectively.

End portion 6 is connected to a venturi air inspirator indicated at 20 and which is supplied with air by a conduit indicated at 22. A pipe 26 connects the air inspirator 20 to the manifold of the automobile's gasoline engine (not shown) and is provided with a valve 27.

The exhaust gases passing through purifier 2 are exhausted through a pipe 28 connected to end portion 8.

A catalyst reservoir 30 discharges into a conduit 32 which in turn is connected to fill pipe 34 which discharges into exhaust purifier 2 between grids 10 and 12. As shown in FIGURE 2, fill pipe 34 can be closed with a screw cap 35.

A conventional vibrator indicated at 38 is removably connected to a transverse beam 39 on the bottom of exhaust purifier 2.

As is shown diagrammatically, a conduit 40 is removably connected to conduit 22 at one end and at the other end is connected to the intake side of a blower 42. The discharge side of blower 42 is connected by conduit 44 to a dust filter-collector 46 which in turn is provided with an air discharge line indicated at 48.

*Operation*

In operation, reservoir 30 is filled with catalyst pellets and then vibrator 38 and blower 42 are placed in operation, with valve 27 in the closed position. Blower 42 causes air to flow through pipe 28 upwardly through catalyst bed B to air inspirator 20 and then through conduit 22, conduit 40, blower 42, conduit 44, filter-collector 46 and conduit 48 to the atmosphere. This results in a condition of negative pressure within the purifier 2 which assists the flow of the catalyst. If desired, the negative pressure can be increased by further restricting pipe 28.

The vibrations may be within a wide range for satisfactory results but will have preferably an amplitude of vibration of the entire purifier housing from about $\frac{1}{1000}''$ to about $\frac{1}{3}''$ and preferably will have a frequency of from about 60 to about 9000 vibrations per minute. Electrical, mechanical and sound vibrators may be employed.

The combination of the action of vibrator 38 and the flow of air through bed B causes the catalyst to flow into bed B from reservoir 30 through conduit 32 with the catalyst pellets filling the bed B uniformly without leaving any voids. After the bed is completely filled with catalyst pellets, blower 42 and vibrator 38 are deenergized and valve 27 is again opened. Conduit 32 is removed from its connection to the exhaust purifier at 34.

As thus described, the filling operation can either be to completely refill the catalyst bed B or merely replace catalyst lost from bed B.

Referring now to FIGURE 2, when it is desired to remove lead dust and other fine particles from catalyst bed B, conduit 48 is connected to exhaust pipe 28. With the opening 34 closed by cup 35 and valve 27 shut, vibrator 38 and blower 42 are placed into operation causing air to flow through the vibrator bed B there to entrain the lead and other dust particles and carry them through to filter-collector 46. In order to accomplish the most efficient rejuvenation, the flow of air caused by blower 42 should be carried out in both directions by reversing blower 42. It will, of course, be evident that when catalyst bed B has been in operation and replacement catalyst is being added as described in connection with FIGURE 1, there will be accomplished in addition to adding the replacement catalyst, the removal of lead and other dust in the same manner as described in connection with FIGURE 2 with the exception that the flow of air will all be in one direction.

*Alternative embodiment*

Figure 3:
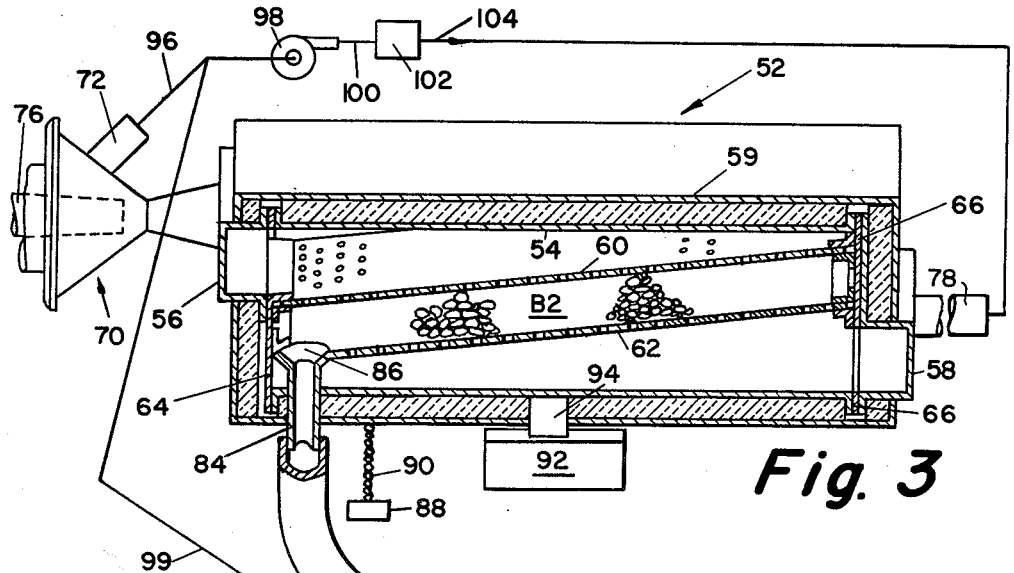
FIGURE 3 is a semi-diagrammatic view of an alternative catalytic exhaust purifier having a sloping catalyst bed and showing modified means for filling and emptying the catalyst, the emptying operation being illustrated.
Figure 4:
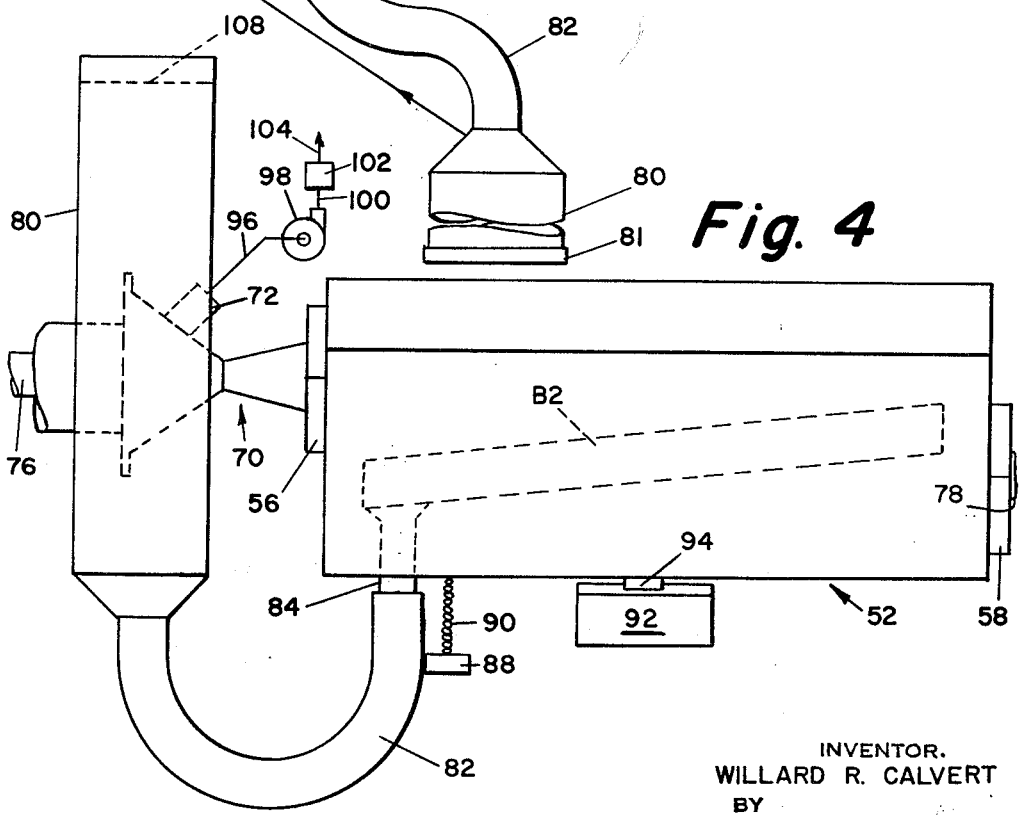
FIGURE 4 is a view of the apparatus of FIGURE 3 illustrating the filling operation.

An alternative embodiment of the invention is illustrated in FIGURES 3 and 4. A modified catalytic exhaust purifier 52 for employment with an automobile is shown in these figures. Purifier 52 has a casing 54 to which end portions 56 and 58 are flanged. An insulation cover 59 overlies casing 54. A catalyst bed indicated at B2 is contained between foraminous grids 60 and 62 which are supported on baffle plates 64 and 66, respectively.

End portion 56 is connected to a venturi air inspirator indicated at 70 and which is supplied with air by a conduit indicated at 72 which being relatively small in diameter acts as a flow restricter in the system. A pipe 76 connects air inspirator 70 to the manifold of the automobile gasoline engine (not shown) and may be provided with a valve similar to valve 27 shown in FIGURE 1, the valve not being shown.

The exhaust gases passing through purifier 52 are exhausted though a pipe 78 connected to end portion 58.

A canister 80 having a lid 81 is connected by a flexible conduit 82 to a pipe 84, the upper end of which discharges at 86 into the closest left-hand lower corner of catalyst bed B2 as viewed in FIGURE 3. Pipe 84 is adapted to be closed off by a cap 88 which is secured by a chain 90 to cover 59.

A conventional vibrator indicated at 92 is removably connected to a transverse beam 94 secured to the bottom of casing 54.

As shown diagrammatically in FIGURES 3 and 4, a conduit 96 is removably connected to conduit 72 at one end and at the other end is connected to the intake side of a blower 98. A conduit 99 connects conduit 96 to the end of canister 80 adjacent to conduit 82. The discharge side of blower 98 is connected by a conduit 100 to a dust filter-collector 102 which in turn is provided with an air discharge line indicated at 104 which is connected to the discharge end of pipe 78.

In carrying out the invention as illustrated in FIGURE 3 to remove catalyst pellets from catalyst bed B2, vibrator 92 and blower 98 are activated with canister 80 in the empty condition placed with a sufficient portion thereof below the lowest level of bed B2 to receive all of the catalyst in the bed. Advantageously, the purifier 52 will be tilted about its longitudinal axis so as to make the point indicated at 86 the lowest part of the bed. This will normally be accomplished by jacking up the right rear end of the vehicle to which the exhaust purifier is connected. The combination of the action of the vibrator 82 and the flow of air through bed B2 caused by the operation of blower 98 causes the ready flowing of catalyst into pipe 84 for passage down through conduit 82 into canister 80 until all the catalyst pellets in bed B2 are fully discharged therefrom. The flow restriction provided by conduit 72 results in a positive pressure in the exhaust purifier tending to force the catalyst out of the bed B2. Further, a negative pressure is provided in canister 80 by its connection to conduit 96 by conduit 99 and this facilitates the flow of catalyst out of bed B2 into canister 80. While a dust filter is employed, the use of a closed air flow circuit provides 100% protection of the working area atmosphere from the dangerous dusts in the purifier.

The loading of catalyst pellets into bed B2 is illustrated in FIGURE 4 which shows apparatus illustrated in FIGURE 3 with the position of canister 80 changed in order to place a sufficient amount of catalyst pellets at a level above the highest level of catalyst bed B2, canister 80 having been filled with catalyst pellets up to the level indicated at 108. Some changes are made for this operation. Lid 81 is removed from canister 80. Conduit 99 is dispensed with and conduit 104 is disconnected from pipe 78 and is permitted to discharge to the atmosphere. For this operation both blower 98 and vibrator 92 are activated. The catalyst pellets due to the vibration of the exhaust purifier 52 and the movement of air therethrough due to the operation of blower 98 and also due to the fact that the level of catalyst in the canister 80 is above the level of the catalyst bed B2 which is being formed runs freely from canister 80 downwardly and then upwardly in conduit 82 into the area between grids 60 and 62 to form a completely filled catalyst bed B2. In this instance, it will be observed that the catalyst pellets behave essentially in the same manner as a fluid. In this operation, the flow restriction by conduit 72 results in a negative pressure within the exhaust purifier.

It will also be understood that the embodiment of the invention described immediately above can also be employed with an exhaust purifier of the type shown in FIGURES 1 and 2 in which exent it is markedly advantageous to jack up the right rear end of the automobile in order to tilt the purifier about its longitudinal and transverse axes.

It will be understood that the above described embodiments are illustrative only and are not intended to be limiting.

What is claimed is:

A system for filling and emptying a catalytic exhaust purifier having a housing containing a pair of grids defining a catalyst pellet bed area comprising, means to vibrate the exhaust purifier, a mobile canister adapted to contain catalyst pellets, a flexible hose communicating with said bed area and with the canister to provide for the positioning of the canister for gravity flow selectively from the canister to the catalyst bed area on filling the purifier and from the bed area to the canister on emptying the exhaust purifier, a blower and means to selectively connect the blower to the housing to place the bed area under a negative pressure on filling the bed area to promote the flow of catalyst into the bed area and to connect the blower to the canister and the housing to place the canister under a negative pressure and the bed area under a positive pressure on emptying the bed area to promote the flow of catalyst from the bed area into the canister.

References Cited by the Examiner

UNITED STATES PATENTS

| | | | |
|---|---|---|---|
| 2,071,119 | 2/37 | Harger | 23—288.3 |
| 2,436,119 | 2/48 | Parker | 141—67 |
| 2,772,147 | 11/56 | Bowen et al. | 23—288.3 |
| 2,979,086 | 4/61 | Hegman et al. | 141—67 |
| 3,041,149 | 6/62 | Houdry | 23—288.3 |
| 3,053,773 | 9/62 | Calvert. | |
| 3,090,676 | 5/63 | Johnson | 23—288.3 |
| 3,112,776 | 12/63 | Riley | 141—67 |

FOREIGN PATENTS

| | | |
|---|---|---|
| 911,490 | 5/54 | Germany. |
| 439,766 | 12/35 | Great Britain. |

MORRIS O. WOLK, *Primary Examiner.*